(12) United States Patent
Watterworth

(10) Patent No.: US 10,591,016 B2
(45) Date of Patent: Mar. 17, 2020

(54) ADJUSTABLE VOLUME CYLINDER FOR STRUT

(71) Applicant: Ford Global Technologies, LLC, Dearborn, MI (US)

(72) Inventor: Michael Shawn Watterworth, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/884,738

(22) Filed: Jan. 31, 2018

(65) Prior Publication Data
US 2019/0234479 A1   Aug. 1, 2019

(51) Int. Cl.
| F16F 9/348 | (2006.01) |
| F16F 9/02 | (2006.01) |
| F16F 9/32 | (2006.01) |
| F16F 9/54 | (2006.01) |
| B62D 33/027 | (2006.01) |
| F16F 9/44 | (2006.01) |

(52) U.S. Cl.
CPC ........ *F16F 9/0245* (2013.01); *B62D 33/0273* (2013.01); *F16F 9/0218* (2013.01); *F16F 9/3242* (2013.01); *F16F 9/44* (2013.01); *F16F 9/54* (2013.01); *F16F 2230/0005* (2013.01); *F16F 2230/16* (2013.01)

(58) Field of Classification Search
CPC .......... F16F 9/0218; F16F 5/00; F16F 9/0245; F16F 9/061; F16F 9/348; F16F 9/368; F16F 9/44

USPC ...... 267/64.12, 120, 124; 188/300; 248/161; 49/343, 344; 296/56, 106, 146.8
See application file for complete search history.

(56) References Cited

U.S. PATENT DOCUMENTS

| 2,091,230 | A | * | 8/1937 | Hodge | D01H 5/50 |
| | | | | | 188/316 |
| 2,695,777 | A | * | 11/1954 | Garrison | B67D 7/64 |
| | | | | | 188/289 |
| 2,736,294 | A | * | 2/1956 | Buehner | F15B 15/24 |
| | | | | | 254/93 R |
| 3,115,897 | A | * | 12/1963 | Sparling | G05D 16/10 |
| | | | | | 138/31 |
| 4,628,579 | A | * | 12/1986 | Taylor | F16F 5/00 |
| | | | | | 188/282.5 |
| 5,044,614 | A | * | 9/1991 | Rau | B60G 15/062 |
| | | | | | 267/175 |
| 5,839,719 | A | * | 11/1998 | Hosan | B62D 25/12 |
| | | | | | 267/64.12 |

(Continued)

FOREIGN PATENT DOCUMENTS

WO    2014111065    7/2014

*Primary Examiner* — Christopher P Schwartz
(74) *Attorney, Agent, or Firm* — David Coppiellie; Carlson, Gaskey & Olds, P.C.

(57) ABSTRACT

An apparatus, according to an exemplary aspect of the present disclosure includes, among other things, a cylinder defining an internal volume and having a first end and a second end. A piston is received within the cylinder, a rod is coupled to the piston and extends outwardly of the first end, and a cap encloses the second end. The cap is selectively movable relative to the cylinder to vary the internal volume. A method according to an exemplary aspect of the present disclosure includes, among other things, selectively moving an end cap relative to a cylinder body to vary internal volume.

26 Claims, 2 Drawing Sheets

(56) References Cited

U.S. PATENT DOCUMENTS

| | | | | |
|---|---|---|---|---|
| 6,010,119 | A | * | 1/2000 | Hsiao .................... F16F 9/0218 |
| | | | | 267/120 |
| 6,347,573 | B1 | | 2/2002 | Henkel et al. |
| 6,755,458 | B1 | | 6/2004 | Oberheide |
| 7,320,198 | B2 | | 1/2008 | Berklich, Jr. et al. |
| 8,403,397 | B2 | | 3/2013 | Adams et al. |
| 9,400,028 | B2 | * | 7/2016 | Aramizu .................... F16F 5/00 |
| 2019/0390730 | A1 | * | 12/2019 | Russell ............... F16K 17/0466 |

* cited by examiner

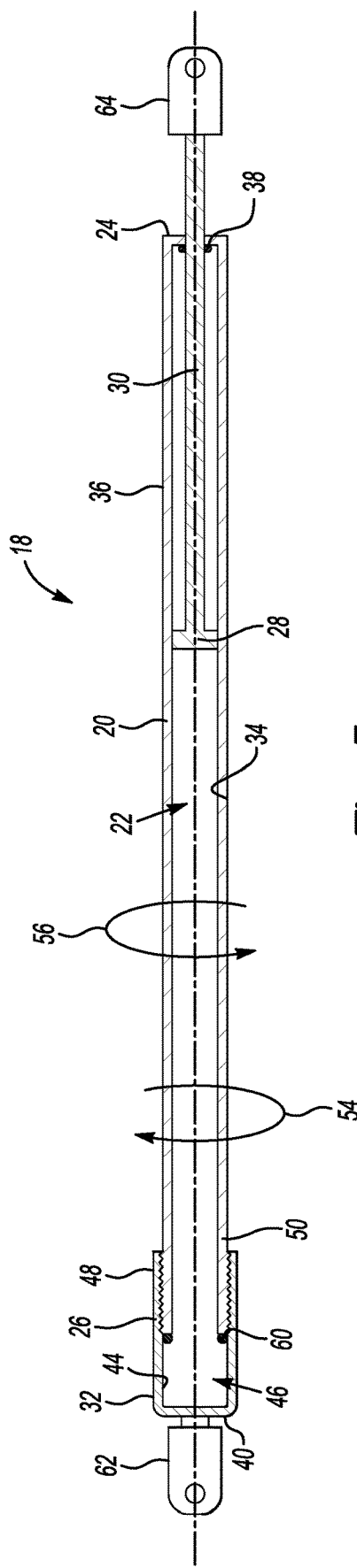
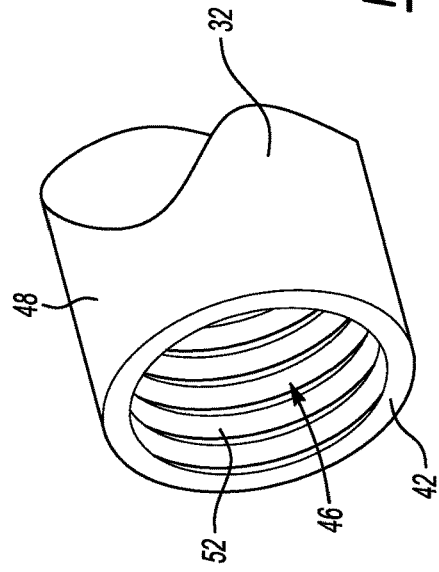

ADJUSTABLE VOLUME CYLINDER FOR STRUT

TECHNICAL FIELD

This disclosure relates to an exemplary apparatus and method of providing a cap for a strut that can be used to vary an internal volume of a strut cylinder.

BACKGROUND

Gas struts are used to connect a vehicle panel, such as a liftgate, decklid, tailgate, etc., to a vehicle body structure such that the panel can be moved between open and closed positions. Traditionally, these struts utilize a fixed attachment point geometry, value of mass, and center of gravity of the panel to calculate a pressure that will provide acceptable opening and closing efforts under a typical temperature operating range. If the mass or center of gravity of the panel being raised or lowered changes, the operating efforts are affected accordingly. For example, if the mass of the panel is reduced or the center of gravity is raised on the panel, for a given temperature, the effort to close will increase and the force/speed at which the panel opens will increase. Conversely, if mass is added or the center of gravity lowered, the panel will rise more slowly or require assistance to open, and the panel may not stay open or sag once a full open position is reached.

Vehicle owners often customize their vehicles to include modifications and/or additions to these types of panels such as lights, bike racks, tire kits, etc. These modifications affect the operation of the struts as described above. Further, due to the inconsistency of the modifications between the various add-on providers, the amount of adjustment to gas strut pressures varies significantly, which results in a large number of different strut pressures that would be required to accommodate the different configurations.

SUMMARY

An apparatus according to an exemplary aspect of the present disclosure includes, among other things, a cylinder defining an internal volume and having a first end and a second end. A piston is received within the cylinder, a rod is coupled to the piston and extends outwardly of the first end, and a cap encloses the second end. The cap is selectively movable relative to the cylinder to vary the internal volume.

In a further non-limiting embodiment of the foregoing apparatus, the rod is configured to be connected to one of a vehicle body structure and a panel moveable relative to the vehicle body structure.

In a further non-limiting embodiment of either of the foregoing apparatus, the cap is configured to be connected to the other of the vehicle body structure and the panel.

In a further non-limiting embodiment of any of the foregoing apparatus, the panel comprises a liftgate, decklid or tailgate.

In a further non-limiting embodiment of any of the foregoing apparatus, a seal is between the cap and the second end of the cylinder.

In a further non-limiting embodiment of any of the foregoing apparatus, a threaded connection is between the cap and the cylinder.

In a further non-limiting embodiment of any of the foregoing apparatus, the inner surface of the cap includes a first thread structure and the outer surface of the cylinder includes a second thread structure that directly engages the first thread structure.

In a further non-limiting embodiment of any of the foregoing apparatus, the cylinder is filled with a fluid, and wherein the internal volume is decreased to increase a pressure of the fluid.

In a further non-limiting embodiment of any of the foregoing apparatus, the cylinder is filled with a fluid, and wherein the internal volume is increased to decrease a pressure of the fluid.

In a further non-limiting embodiment of any of the foregoing apparatus, the cap includes an attachment member to be coupled to a movable panel or a fixed vehicle structure.

An apparatus according to another exemplary aspect of the present disclosure includes, among other things, a fixed vehicle structure, a panel moveable relative to the structure, and a cylinder defining an internal volume. The cylinder includes a piston, a rod coupled to the piston and extending outwardly of a first end of the cylinder, and a cap enclosing a second end of the cylinder, wherein the cap is selectively movable to vary the internal volume.

In a further non-limiting embodiment of any of the foregoing apparatus, the cap includes a first attachment member coupled to one of the panel and structure and the rod includes a second attachment member coupled to the other of the panel and structure.

In a further non-limiting embodiment of any of the foregoing apparatus, the cylinder is filled with a fluid, and wherein the internal volume is decreased to increase a pressure of the fluid and is increased to decrease a pressure of the fluid.

In a further non-limiting embodiment of any of the foregoing apparatus, a threaded connection is between the cap and the cylinder.

In a further non-limiting embodiment of any of the foregoing apparatus, a seal is between the cap and the second end of the cylinder.

A method according to another exemplary aspect of the present disclosure includes the steps of, among other things: providing a cylinder body defining an internal volume and having a piston rod extending our from a first end and an end cap enclosing a second end; and selectively moving the end cap relative to the cylinder body to vary the internal volume.

In a further non-limiting embodiment of the foregoing method, the method includes coupling the first end to one of a vehicle structure and moveable panel, coupling the second end to the other of the vehicle structure and moveable panel, and varying the internal volume as needed in response to a change in weight and/or location of a center of gravity of the panel.

In a further non-limiting embodiment of either of the foregoing methods, the method includes threadably connecting the end cap to the cylinder body.

In a further non-limiting embodiment of any of the foregoing methods, the method includes sealing the end cap relative to the cylinder body to prevent fluid from escaping from the cylinder.

In a further non-limiting embodiment of any of the foregoing methods, the method includes filling the cylinder body with a fluid, and adjusting a position of the end cap relative to the cylinder body to decrease the internal volume and increase a pressure of the fluid, and adjusting a position of the end cap relative to the cylinder body to increase the internal volume and decrease the pressure of the fluid.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 is a section view of a strut assembly as used to connect the tailgate to a vehicle body structure.

FIG. 4 is an end view of a cap from the strut assembly of FIG. 3.

DETAILED DESCRIPTION

This disclosure details exemplary apparatus and methods of providing a cap for a strut that can be used to vary an internal volume of a strut cylinder to adjust closing/opening efforts of a vehicle panel as needed. These and other features are discussed in greater detail in the following paragraphs of this detailed description.

Figure 1:
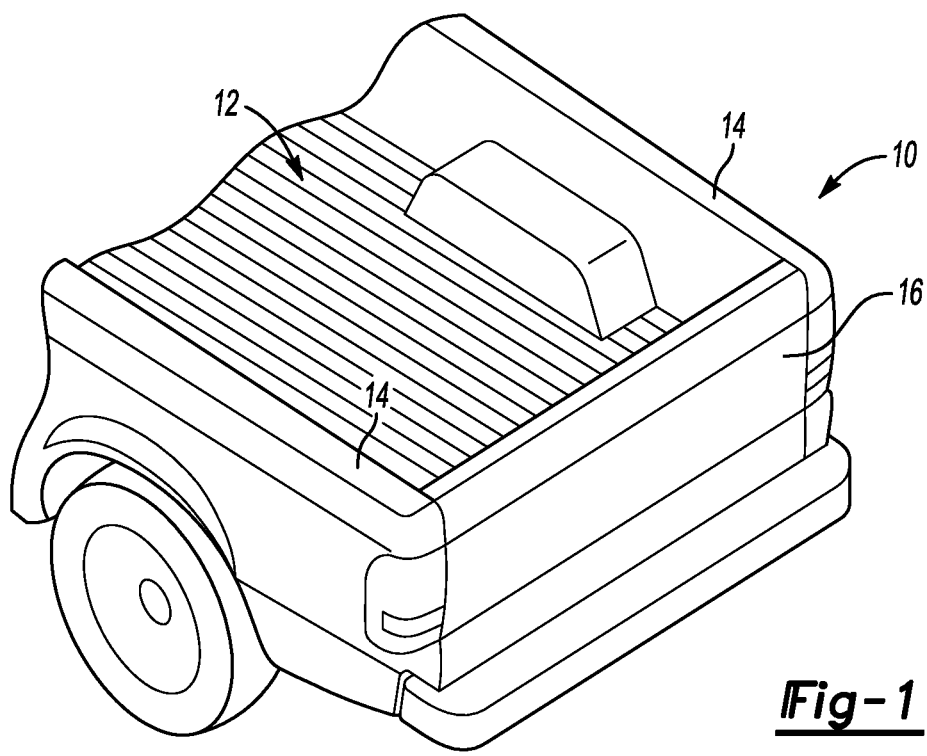
FIG. 1 schematically illustrates a rear perspective view of a pick-up truck with a tailgate in a tailgate closed or non-deployed position.
Figure 2:
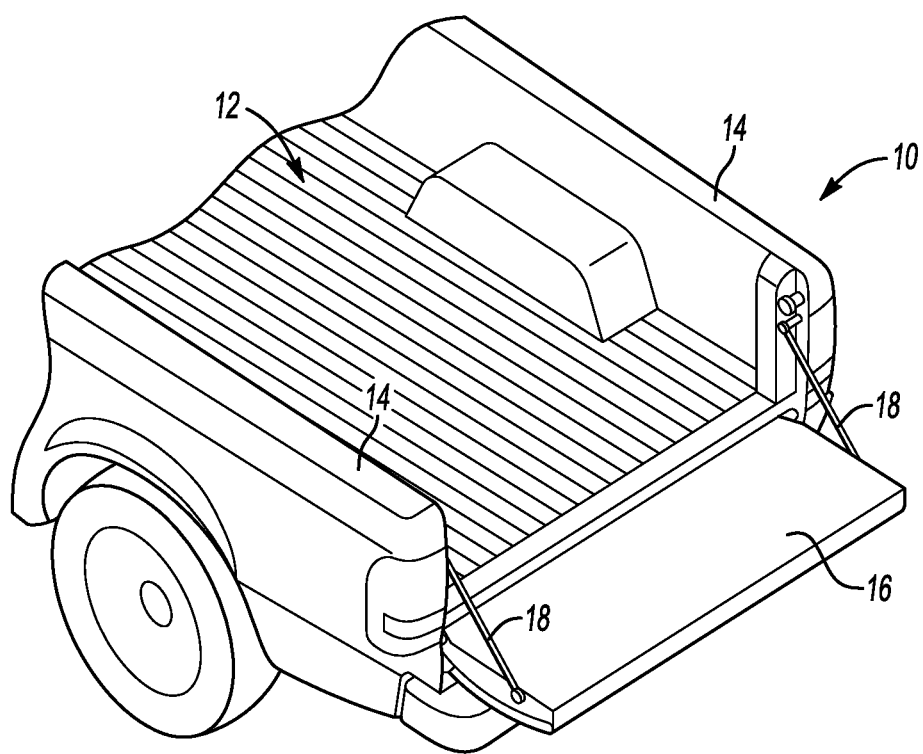
FIG. 2 shows the tailgate of FIG. 1 in the deployed or open position.

Gas struts are used to connect a moveable vehicle panel, such as a liftgate, decklid, tailgate, etc., to a vehicle body structure. The struts control movement of the panel as the panel is moved between an open position and a closed position. FIG. 1 shows an example of a pick-up truck 10 having a cargo bed area 12 that is defined by a pair of side walls 14 and a moveable panel that comprises a tailgate 16 that extends between the side walls 14. The tailgate 16 is moveable between a closed position (FIG. 1) and a normal tailgate deployed or open position (FIG. 2). A pair of struts 18 are used to connect the moveable panel, e.g. the tailgate 16, to a fixed vehicle body structure, e.g. the side walls 14 of the cargo bed area 12. The struts 18 are configured to allow the tailgate 16 to be pivoted from the closed position to the open position in a controlled manner to provide access to the cargo bed area 12.

FIG. 3 shows an example of a strut 18 that incorporates the subject invention, and which can be used to control the movement of the panel shown in FIGS. 1-2. It should be understood that the tailgate 16 of FIGS. 1-2 is merely one example of a moveable panel, and that the struts 18 can be used with other panels such as decklids, liftgates, etc.

The strut 18 includes a cylinder 20 defining an internal volume 22 and having a first end 24 and a second end 26. A piston 28 is received within the cylinder 20. A rod 30 is coupled to the piston 28 and extends outwardly of the first end 24. An end cap 32 encloses the second end 26. The cap 32 is selectively movable relative to the cylinder 20 to vary the internal volume 22.

The cylinder 20 has an inner surface 34 that defines the internal volume 22 and an external surface 36. The piston 28 slides along the inner surface 34 as the panel is moved between open and closed positions. The piston 28 is coupled to the rod 30 in a known manner and a seal 38 is provided at the first end 24 of the cylinder 20. The operation of the piston 28, rod 30 and seal 38 are well known and will not be discussed in greater detail.

The second end 26 of the cylinder is an open end. The cap 32 is used to completely enclose this open second end 26. In one example, the cap 32 comprises a cup-shaped component that has an enclosed end 40 and an open end 42 (FIG. 4). The cap 32 has an inner surface 44 that defines an open internal volume 46 of the cap 32 and an outer surface 48. The internal volume 46 of the cap 32 is added to the internal volume 22 of the cylinder 20 to define an overall internal volume for the strut 18. A fluid, such as gas for example, is used to fill the internal volume to set a desired pressure for the opening and closing effort. The cap 32 is selectively moved relative to the cylinder 20 by a customer or end-user to adjust the overall internal volume to vary the pressure and set a desired open/closing effort.

In one example, a threaded attachment is used between the cap 32 and the cylinder 20. In one example, the external surface 36 of the cylinder 20 includes a first threaded structure 50 (FIG. 3) and the internal surface 44 of the cap 32 includes a second threaded structure 52 (FIG. 4). The cap 32 is rotated as indicated at 54 to increase the pressure by decreasing the amount of internal volume 46 of the cap 32 that is added to the internal volume 22 of the cylinder 20. As the cap 32 is rotated in direction 54, the cap 32 moves in an axial direction along the length of the cylinder 20 to shorten an overall length of the combined cap and cylinder. The cap 32 is rotated in the opposite direct as indicated at 56 to decrease the pressure by increasing the amount of internal volume 46 of the cap 32 that is added to the internal volume 22 of the cylinder 20. As the cap 32 is rotated in direction 56, the cap 32 moves in an opposite axial direction along the length of the cylinder 20 to increase the overall length of the combined cap and cylinder. A threaded attachment is one example of adjusting the position of the cap 32 relative to the cylinder 20, other attachment methods could also be used.

A seal 60 is included within the cap 32 to provide a sealed interface at the second end 26 of the cylinder 20. In one example, the seal 60 is fixed to the second end 26 of the cylinder 20. The seal 60 can be seated within a groove, for example. As the position of the cap 32 is adjusted, the seal 60 slides along the internal surface 44 of the cap 32 such that the sealed interface is provided at all adjustment positions. FIG. 3 shows the cap 32 in the fully extended cap position.

The enclosed end 40 of the cap 32 includes a first attachment structure 62 and the rod 30 includes a second attachment structure 64. One of the attachment structures 62, 64 attaches/couples the strut 18 to the moveable panel and the other structure 62, 64 attaches/couples the strut 18 to the fixed vehicle structure. Any type of attachment structure can be used at these locations. The operation and composition of these attachment structures are well known and will not be discussed in detail.

The first and second attachment structures 62, 64 remain fixed to the panel/vehicle structure as the panel moves between open and closed positions. The piston 28 slides within the cylinder 20 as the rod 30 extends outwardly of the first end 24 to extend the length of the strut 18 as the panel moves to the open position. The rod 30 retracts back into the cylinder 20 as the panel moves to the closed position. As discussed above, the position of the cap 32 is selectively moved relative to the cylinder 20 to vary the internal volume and adjust the internal pressure as needed in response to a change in weight and/or location of a center of gravity of the panel.

Thus, the subject invention provides a strut cylinder with an adjustable cap on the end opposite of the opening for the piston/rod. This cap includes a seal that can be similar to the seal that seals the rod to the cylinder. Upon tightening the cap, the volume of the cylinder gas chamber is reduced to increase the pressure of the gas in the strut. Conversely, when the cap is loosened, the volume of the cylinder chamber increases and the pressure of the gas would be reduced in the strut. Thus, when a vehicle is equipped with these cylinders, a modification to the mass of center of gravity of a liftgate/tailgate/decklid could be compensated for by tightening or loosening the cap of the gas strut sufficiently to restore proper function of liftgate/tailgate/decklid.

For example, if a tire kit is added to an inner panel of a liftgate, the additional mass mounted low on the gate would cause the liftgate to sag (especially at cold temperatures). To counteract the sagging of the liftgate, the caps of the gas struts could be tightened to reduce the chamber volume and increase the strut pressure to compensate. Conversely, if something is removed from the liftgate such as a trim panel or glass, the liftgate would be hard to close and open with much more force (especially on hot days). To counteract the high closing efforts, the caps on the gas strut can be loosened which would lower the pressure in the strut to compensate.

As such, the subject invention provides an end cap for a strut that can be adjusted to vary the internal volume, and accordingly, the pressure within the cylinder to adjust closing and opening efforts as needed. The advantage of this solution is that there an infinite number of adjustments/modifications can be made to cover a wide range of different struts with different pressures. With an adjustable volume cylinder, the pressure in the cylinder can be tuned to the specific mass and center of gravity required for the specific set of modifications that have been made to the panel. This provides the add-on providers with the capability to tune the cylinder pressure such that the opening/closing efforts are within a reasonable range for the operator. This avoids the requirement for a unique cylinder with a unique pressure for each mass/center of gravity combination. An added benefit of this configuration is that the pressure can be increased as the gas strut wears over time. This would allow adjustments to be made to restore proper function over the course of the gas strut useful life.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
a cylinder defining a cylinder internal volume and having a first end and a second end;
a piston received within the cylinder;
a rod coupled to the piston and extending outwardly of the first end; and
a cap enclosing the second end and being axially spaced from the piston, wherein the cap has a cap open internal volume extending from an enclosed end surface to an open end, and wherein the enclosed end surface is open to the cylinder internal volume such that the cap open internal volume is added to the cylinder internal volume to define an overall internal volume, and wherein the cap is selectively movable relative to the cylinder to vary the overall internal volume.

2. The apparatus according to claim 1, wherein the rod is configured to be connected to one of a vehicle body structure and a panel moveable relative to the vehicle body structure.

3. The apparatus according to claim 2, wherein the cap is configured to be connected to the other of the vehicle body structure and the panel, and wherein the overall internal volume is selectively varied in response to a change in weight and/or location of a center of gravity of the panel.

4. The apparatus according to claim 3, wherein the panel comprises a liftgate, decklid or tailgate.

5. The apparatus according to claim 1, including a seal between the cap and the second end of the cylinder.

6. The apparatus according to claim 1, including a threaded connection between the cap and the cylinder.

7. The apparatus according to claim 6, wherein the inner surface of the cap includes a first thread structure and the outer surface of the cylinder includes a second thread structure that directly engages the first thread structure.

8. The apparatus according to claim 1, wherein the cylinder is filled with a fluid, and wherein the internal volume is decreased to increase a pressure of the fluid.

9. The apparatus according to claim 1, wherein the cylinder is filled with a fluid, and wherein the internal volume is increased to decrease a pressure of the fluid.

10. The apparatus according to claim 1, wherein the cap includes an attachment member to be coupled to a movable panel or a fixed vehicle structure.

11. The apparatus according to claim 1, including a seal fixed to the second end of the cylinder and in sliding engagement with an inner surface of the cap.

12. The apparatus according to claim 1, wherein the piston is axially spaced from the cap open internal volume such that the cap does not surround the piston.

13. An apparatus, comprising:
a fixed vehicle structure;
a panel moveable relative to the structure;
a cylinder defining a cylinder internal volume and including a piston, a rod coupled to the piston and extending outwardly of a first end of the cylinder, and a cap enclosing a second end of the cylinder and being axially spaced from the piston, wherein the cap has a cup-shaped body extending from an enclosed end to an open end, and wherein the cap has a cap open internal volume extending from an inner surface of the enclosed end to the open end, and wherein the inner surface of the enclosed end is open to the cylinder internal volume such that the cap open internal volume is added to the cylinder internal volume to define an overall internal volume, and wherein the cap is selectively movable to vary the overall internal volume.

14. The apparatus according to claim 13, wherein the cap includes a first attachment member coupled to one of the panel and structure and the rod includes a second attachment member coupled to the other of the panel and structure, and wherein the overall internal volume is selectively varied in response to a change in weight and/or location of a center of gravity of the panel.

15. The apparatus according to claim 13, wherein the cylinder is filled with a fluid, and wherein the internal volume is decreased to increase a pressure of the fluid and is increased to decrease a pressure of the fluid.

16. The apparatus according to claim 13, including a threaded connection between the cap and the cylinder.

17. The apparatus according to claim 13, including a seal between the cap and the second end of the cylinder.

18. The apparatus according to claim 13, including a seal fixed to the second end of the cylinder and in sliding engagement with an inner surface of the cap.

19. The apparatus according to claim 13, wherein the cap comprises a cup-shaped body having an enclosed end providing the enclosed end surface that is open to the cylinder internal volume, and wherein the piston is axially spaced from the cap open internal volume such that the cap does not surround the piston.

20. A method, comprising:
providing a cylinder body defining a cylinder internal volume, a piston rod extending out from a first end of the cylinder body, a piston coupled for movement with the rod, and an end cap axially spaced form the piston and enclosing a second end of the cylinder, wherein the end cap extends from an enclosed end surface to an open end to define a cap open internal, and wherein the enclosed end surface is open to the cylinder internal volume such that the cap open internal volume is added to the cylinder internal volume to define an overall internal volume, and; and selectively moving the end cap relative to the cylinder body to vary the overall internal volume.

21. The method according to claim 20, including threadably connecting the end cap to the cylinder body.

22. The method according to claim 21, including sealing the end cap relative to the cylinder body to prevent fluid from escaping from the cylinder.

23. The method according to claim 21, including filling the cylinder body with a fluid, and adjusting a position of the end cap relative to the cylinder body to decrease the overall internal volume and increase a pressure of the fluid, and adjusting a position of the end cap relative to the cylinder body to increase the overall internal volume and decrease the pressure of the fluid.

24. The method according to claim 20, including coupling the first end to one of a vehicle structure and moveable panel, coupling the second end to the other of the vehicle structure and moveable panel, and varying the overall internal volume as needed in response to a change in weight and/or location of a center of gravity of the panel.

25. The method according to claim 20, including fixing a seal to the second end of the cylinder such that an inner surface of the end cap is sliding engagement with the seal during movement of the end cap relative to the cylinder body.

26. The method according to claim 20, wherein the end cap comprises a cup-shaped body having an enclosed end providing the enclosed end surface that is open to the cylinder internal volume, and wherein the piston is axially spaced from the cap open internal volume such that the end cap does not surround the piston.

* * * * *

UNITED STATES PATENT AND TRADEMARK OFFICE
CERTIFICATE OF CORRECTION

PATENT NO. : 10,591,016 B2  
APPLICATION NO. : 15/884738  
DATED : March 17, 2020  
INVENTOR(S) : Michael Shawn Watterworth Page 1 of 1

It is certified that error appears in the above-identified patent and that said Letters Patent is hereby corrected as shown below:

In the Claims

In Claim 20, Column 7, Line 25; replace "form" with --from--

In Claim 20, Column 7, Line 28; replace "a cap open internal" with --a cap open internal volume--

In Claim 20, Column 7, Line 32; replace "volume, and; and" with --volume; and--

In Claim 25, Column 8, Line 23; replace "is sliding engagement" with --is in sliding engagement--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*